United States Patent

Williams et al.

[11] Patent Number: 6,130,857
[45] Date of Patent: Oct. 10, 2000

[54] AURAL ENHANCEMENT OF ACTIVE SONAR SYSTEMS

[75] Inventors: Jack R. Williams, Anaheim; Shelby F. Sullivan, Solana Beach; James M. Alsup, San Diego, all of Calif.

[73] Assignee: The United States of America as represented by the Secretary of the Navy, Washington, D.C.

[21] Appl. No.: 06/795,481

[22] Filed: Mar. 15, 1985

[51] Int. Cl.⁷ ............................................. G01S 15/00
[52] U.S. Cl. ............................................................ 367/98
[58] Field of Search .................................. 367/87, 90, 94, 367/97, 98, 135, 136, 116; 343/5 FT; 342/196; 702/143

[56] References Cited

U.S. PATENT DOCUMENTS

| | | | |
|---|---|---|---|
| 3,610,901 | 10/1971 | Lynch | 343/5 FT |
| 3,878,526 | 4/1975 | Pedersen | 343/7.7 |
| 4,206,510 | 6/1980 | Strait | 367/94 |
| 4,349,897 | 9/1982 | Boehme et al. | 367/98 |
| 4,398,274 | 8/1983 | Chotiros | 367/90 |

*Primary Examiner*—Daniel T. Pihulic
*Attorney, Agent, or Firm*—Harvey Fendelman; Michael A. Kagan; Edmund W. Rusche

[57] ABSTRACT

A system is presented for enhancing sonar signals wherein Doppler echoes received in the time domain from a sonar system are processed by digitizing, shifting to baseband, Fourier transforming to the frequency domain, applying a frequency stretching algorithm designed to expand low Doppler signals, retransforming the signal back to the time domain, reshifting from baseband to original center frequency, converting to analog and outputting the resultant enhanced Doppler time domain signals to either earphones of a sonar operator for audio monitoring or for further processing for visual display.

5 Claims, 9 Drawing Sheets

AURAL ENHANCEMENT OF ACTIVE SONAR SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Early active sonar systems relied on the audio sense of the human operators to make detection of targets. Sonar systems generated acoustical signals which were transmitted through the water environment of the oceans to reflect off of targets and return as echo signals. The returned signal was converted to an electrical signal, conditioned, and fed to the human operator where he could listen to the echo signal through the use of headphones. It was the operator's ability to resolve subtle differences in acoustical sounds that allowed him to make a detection of a target and to evaluate the operational conditions for various targets.

Recently, more emphasis has been put on the implementation of receiver/processor hardware to provide visual presentation to the human operator. This is to enhance so called multi-parameter estimation capability, e.g., range, Doppler, azimuth, etc. The human operator's auditory role thus diminished.

Further, the transmit frequency of active sonar systems has been lowered in order to achieve longer ranges within the ocean medium. Typical operational frequencies have been changed from 26–38 kHz for the older systems to 6.5–9.5 kHz for more modern systems. This is a decrease by a factor of four and has effected the resultant hearable frequency offset caused by Doppler shift which had been monitored aurally by the operator. The decrease in Doppler sensitivity is particularly noticeable for shallow-water and/or low-velocity target conditions for which reverberation can more easily mask target echoes. These are generally thought to be the primary reasons for the decreased use of the audio capability or channel for active target detection.

SUMMARY OF THE INVENTION

This invention addresses the general problem of converting received sonar signal data for modern high frequency sonar systems into signals which can be monitored in the audio frequency range by a human operator. More particularly, a method and device is presented which accepts as input the "normal" audio signal provided by an existing sonar processor, e.g., the Navy's AQA-7 receiver, and provides as output an enhanced audio signal more suitable for the recognition and detection of sonar target echoes, specifically in the low-doppler region.

Modern digital technology is utilized to address this issue since complicated algorithms using dense, special purpose computing elements can be achieved with relative ease. In particular, the changes required to adjust the audio signal so that low Doppler shifts are transformed into moderate Doppler shifts can be readily implemented by utilizing off the shelf components which may be fabricated into small, compact units. FFT's and other algorithms such as spectral whiteners and signal averagers are available to more closely match the characteristics of the received signal (especially target echoes) to those of the human ear. This allows the human operator to more effectively supplement the existing visually-oriented receiver and processor outputs for improving detection and estimation of target echo characteristics.

The system can be designed as a stand alone, self-powered aural enhancement accessory fabricated as a small electronics module which plugs into an audio output jack normally present at the sonar sensor station. The operator's headset is then plugged into this module. The functional process for the invention is described as follows.

The signal output from the sonar processor is sampled at a predetermined frequency and is digitized. In the preferred embodiment the sampling frequency used was 4,096 Hz and digitization was to 12 bits. The signal is then complex-translated to baseband (0 Hz). The digitized signal is then decimated to a new sample rate of, e.g., 512 Hz. A notch filter is applied to reduce the reverberation part of the signal by some preselected level. Control through a multi-level threshold adjuster is designed to adaptively set the variable notch filter.

The signal is then transformed to the frequency domain via a discrete fast Fourier transform with 512 point blocks overlapped 75 percent. The frequency coefficients are converted to magnitudes and the phases are discarded. Additional notching is performed to complete removal of the reverberation noise. The additional notching is also accomplished through a variable notch filter under the control of the multi-level threshold adaptive adjuster.

Line integration is performed on four adjacent transforms and the background noise level estimated at each frequency. The signal output after the second notching is further modified in accordance with the background level estimated at each frequency. The resultant signal is determined by applying a non-linear gain to the frequency coefficients above a preset threshold.

The frequency coefficients are then reallocated for times-eight spread (near zero-Doppler). New phases are injected to allow inverse Fourier transforms to be taken of the signal which will result in an acoustical signal of a continuous sound form. The inverse Fourier transform is taken with 1,024 point blocks. Signal blocks are duplicated and butted end-to-end thereby providing an 8,192 Hz sample rate.

The original reverberation obtained from the digitized input acoustical signal is attenuated and mixed with the processed signal. The signal is then scaled and converted to analog via an eight-bit digital to analog converter and a 1,600 Hz low-pass filter. The final signal is then output for aural or visual monitoring by the operator.

OBJECTS OF THE INVENTION

An object of the invention is to provide a method and system which accepts as input the "normal" audio signal output by a sonar processor and converts this output into an enhanced audio output more suitable for recognition and detection of sonar target echo characteristics.

A second object of the invention is to present a method and system which will convert the audio signal output from a sonar processor containing range and Doppler information into an enhanced audio output wherein the signal echoes have been modified to occur at frequencies more amenable to recognition by an operator using human auditory or aural methods.

These and other objects of the invention will become more readily apparent from the ensuing specification when taken together with the drawings.

DESCRIPTION OF THE PREFERRED EMBODIMENT

The purpose of this invention is to enhance the audio output of existing sonar systems in order to provide an exaggerated Doppler shift and echo gain which can then be more easily detected. Sonar systems at present output unprocessed, Doppler shifted echoes which for many low-Doppler conditions are undetectable by the human ear because the echoes are often buried in the noise of the system and the reverberation in the echo signal.

The techniques of this invention provide a method for exaggerating the Doppler shift thereby making it more detectable to the human operator. In addition, reverberation noise is de-emphasized while level-dependent gain is given to echo components to further enhance target detectability. Conventional signal timing, i.e., the signal is not sped up nor slowed down, is maintained so that maximum use can be made of the existing visual displays in conjunction with improved audio output. Consequently, real time analysis remains feasible.

The preferred embodiment described concentrates on using this technique for developing an enhanced audio signal. However, the output of this technique is equally applicable to feeding a visual display which shows the enhanced echoes separated from masking reverberation noises and more clearly displayed in recognizable form at low Doppler level signals.

Figure 8:
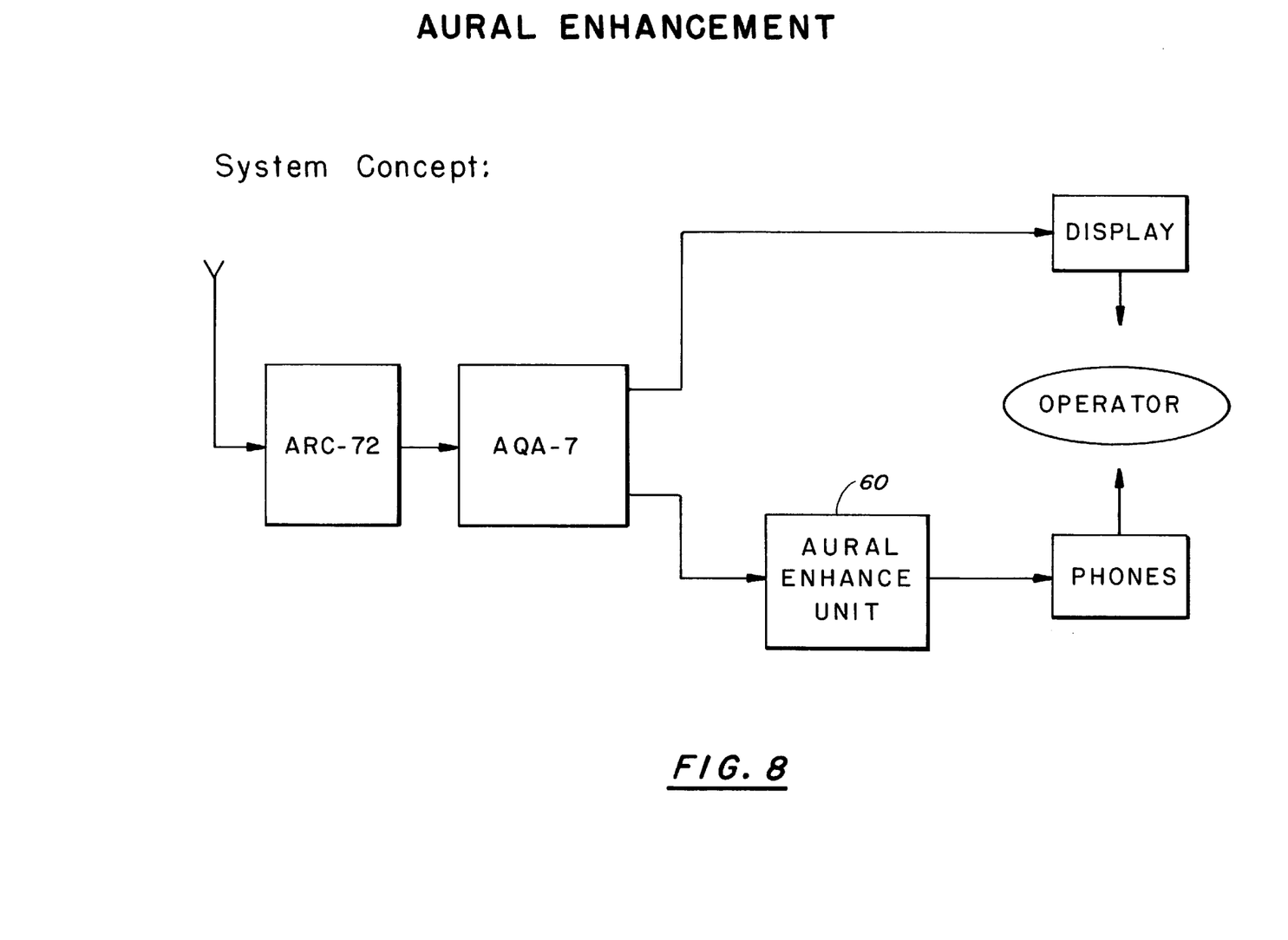
FIG. 8 shows a block diagram showing the sonar system and operator and the aural enhancement unit placed in its operational position.

FIG. 8 shows an aural enhancement unit as installed in a Navy sonar system. The output of the sonar system is processed for enhancing the acoustical signal which is then fed to the earphones used by an operator. The system concept depicted shows the output from an AQA-7 sonar processor input into aural enhancement unit 60 which in turn outputs to the phones of the operator.

The aural enhancement is partially achieved by artifically increasing the Doppler shift by a factor of about eight, for low Doppler targets. This makes low level, low Doppler echoes detectable by the human ear. Adaptive reverberation notching and signal-based gain also contribute to the enhancement.

A DICASS sonobuoy has a Doppler sensitivity of about 5 Hz per knot. Since the typical human ear cannot readily perceive a frequency shift of less than 20 Hz at a center frequency of 800 Hz (the output frequency for the AQA-7 unit), an operator cannot usually detect target echoes with less than four knots of Doppler shift with this system. By aural enhancement the Doppler signal is exaggerated to a frequency which gives the operators the ability to detect target echoes with Doppler velocity as low as about 0.5 knots.

There are likely to be cases in which the ear may outperform the eye, since the signal processing used for aural enhancement takes into account the non-white nature of the reverberation. Such cases occur when the echo has such a small Doppler shift that it is actually riding on the skirts of the reverberation. Consequently, the aural detectability can be brought up to exceed the existing visual detectability which is often based upon a less-sophisticated process, and the possibility for synergistic interaction of the two senses arises to provide better detectability than the use of either alone.

The key features of the invention are: the utilization of one or a combination of algorithms implemented to spread the frequency spectrum in the low Doppler shift region; the reduction or removal of reverberation noise which interferes with target detectability; and the application of gain to signal echo components. FIGS. 2 through 7 display plots which reflect the effect of various possible algorithms for converting acoustic signals centered at an input frequency of 800 Hz to an enhanced output signal.

Figure 2:
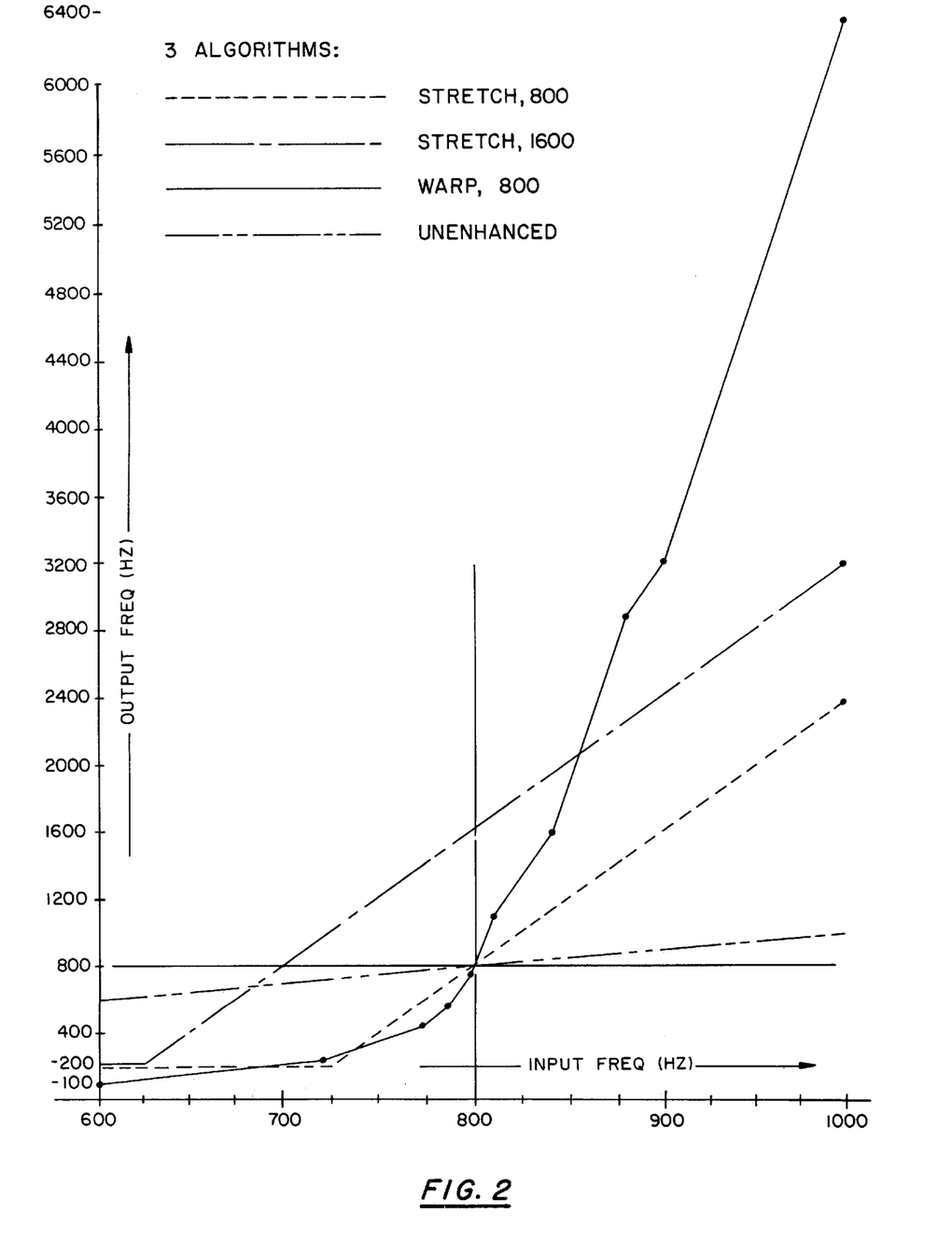
FIG. 2 shows plots comparing the characteristics of various enhancement algorithms.
Figure 3:
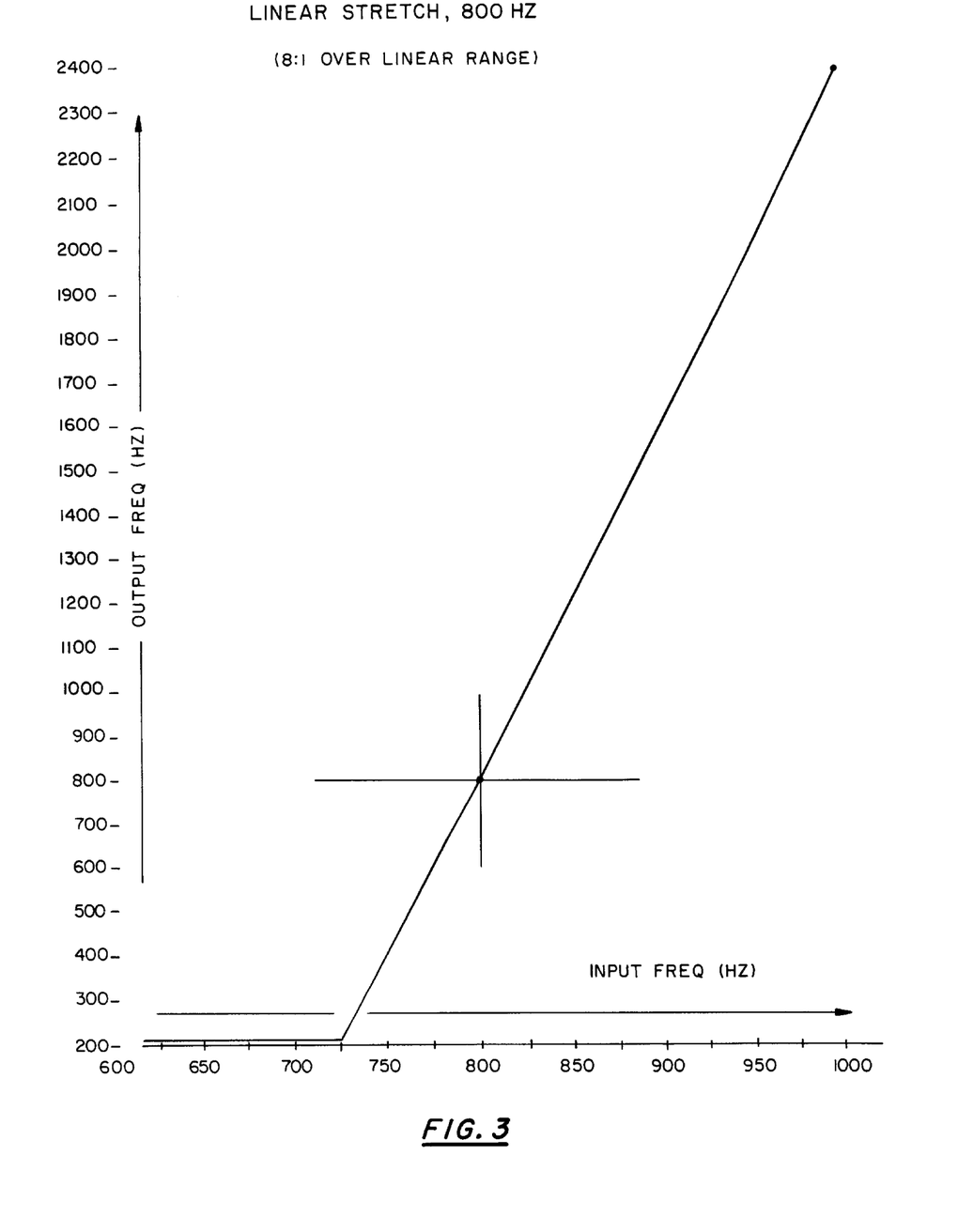
FIG. 3 shows the remap plot for the linear stretch enhancement algorithm with the output frequency centered at 800 Hz.
Figure 4:
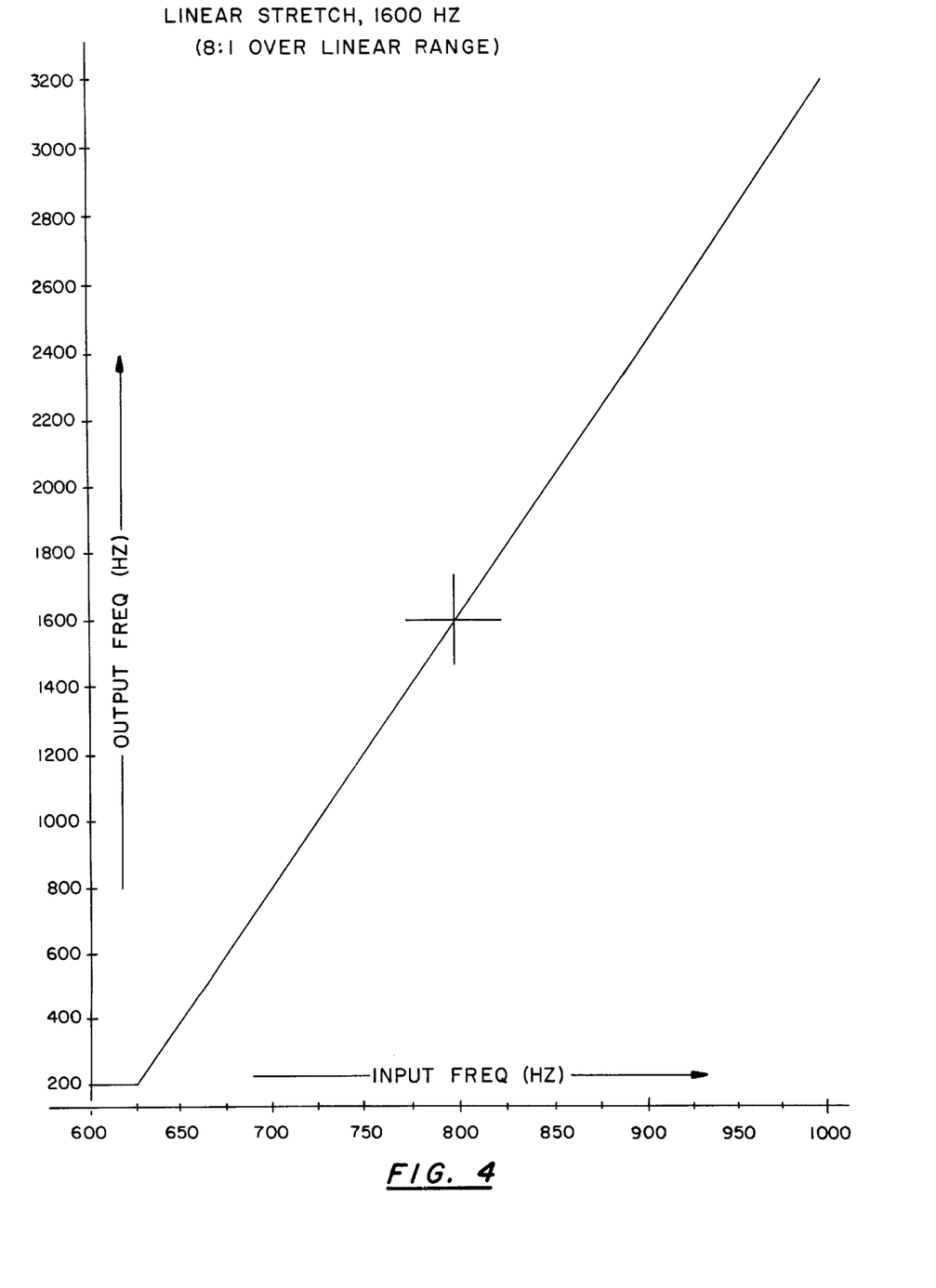
FIG. 4 shows the linear stretch enhancement algorithm with the output frequency centered at 1,600 Hz.
Figure 5:
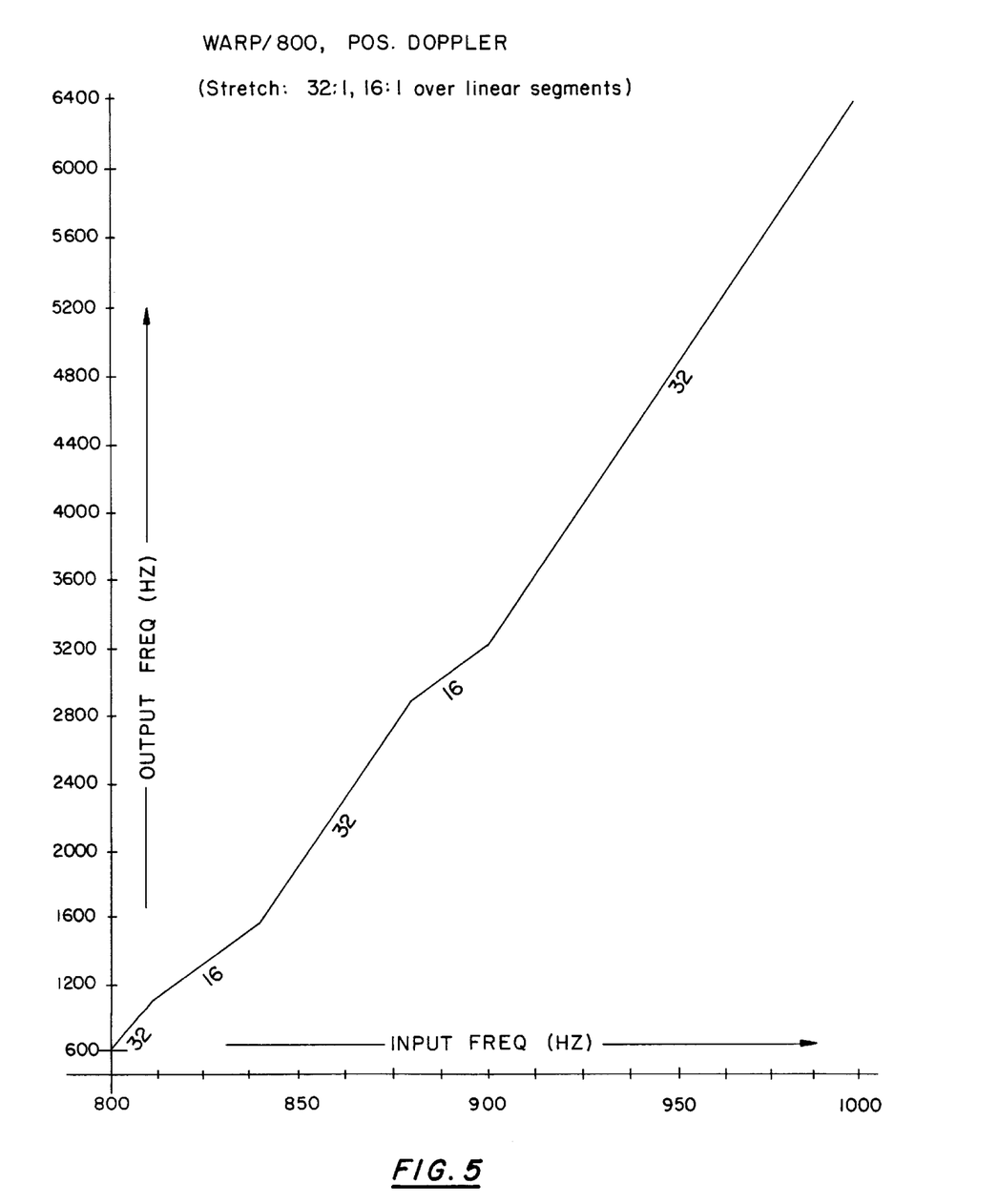
FIG. 5 shows the WARP enhancement remap characteristic for positive Doppler with the output frequency centered at 800 Hz.
Figure 6:
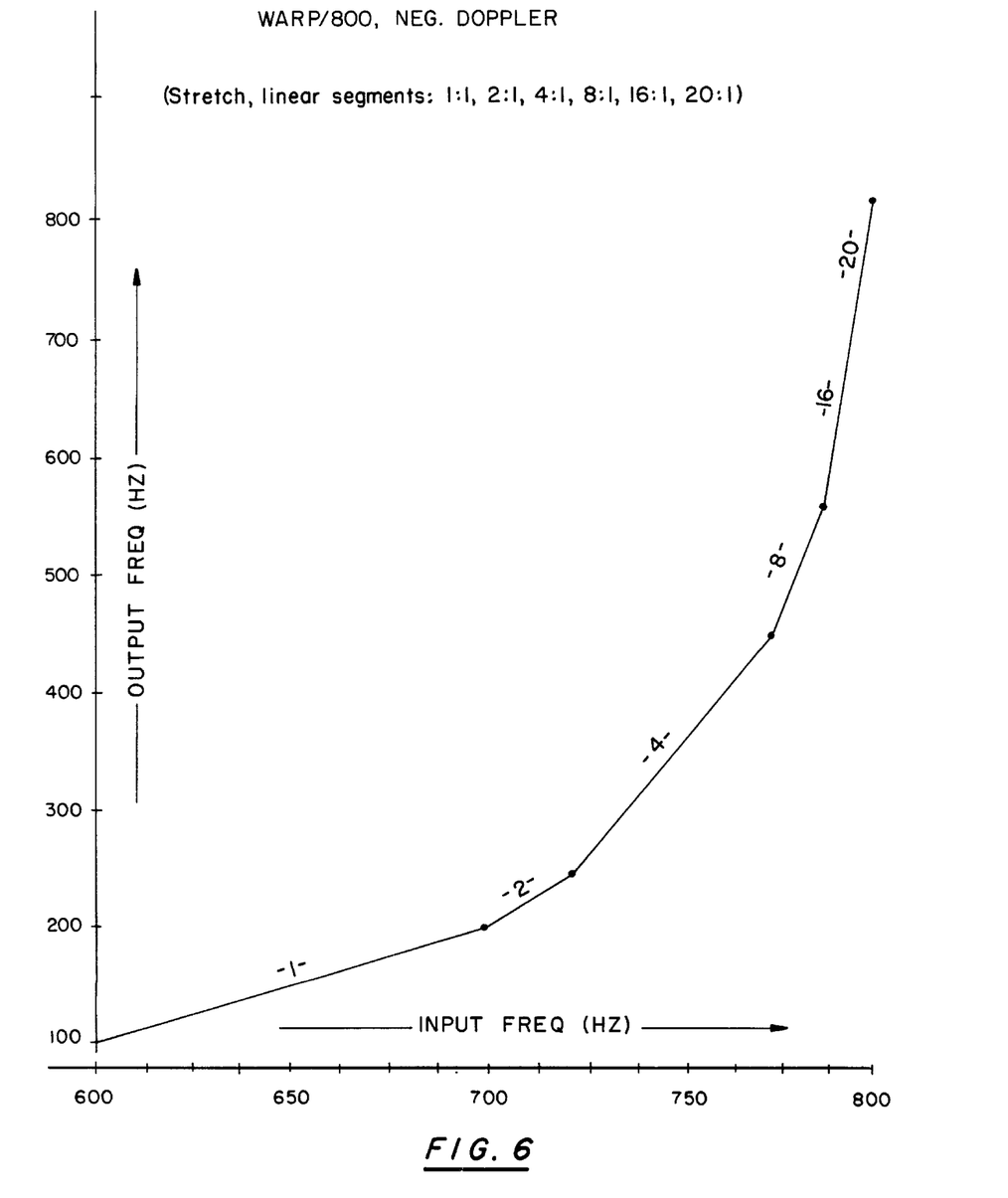
FIG. 6 shows the WARP enhancement remap characteristic for negative Doppler with the output frequency centered at 800 Hz.

FIG. 2 shows a comparison plot displaying algorithms which represent: linear stretching with the output frequency centered at 800 Hz; linear stretching with the output frequency centered at 1,600 Hz; a WARP procedure (meaning to bend a curve into some warped shape) with output centered at 800 Hz; and the generally unenhanced curve for the input signal as exists. FIG. 3 presents the linear stretch type algorithm where the output frequency is set at 800 Hz. FIG. 4 shows the linear stretch algorithm with the output frequency set at 1,600 Hz and, as shown in FIG. 3, an eight-to-one stretching is implemented over the linear range. FIG. 5 shows the WARP curve with the output frequency set at 800 Hz. This figure applies only to the positive Doppler region. Stretching varies from region to region with certain regions having applied a thirtytwo-to-one linear stretching factor and other regions a sixteen-to-one linear stretching factor. FIG. 6 shows the WARP algorithm plotted for the region of negative Doppler. Depending on the frequency range linear stretching ratios have been used on different segments, said stretching ratios ranging from one-to-one up to twenty-to-one.

Figure 7:
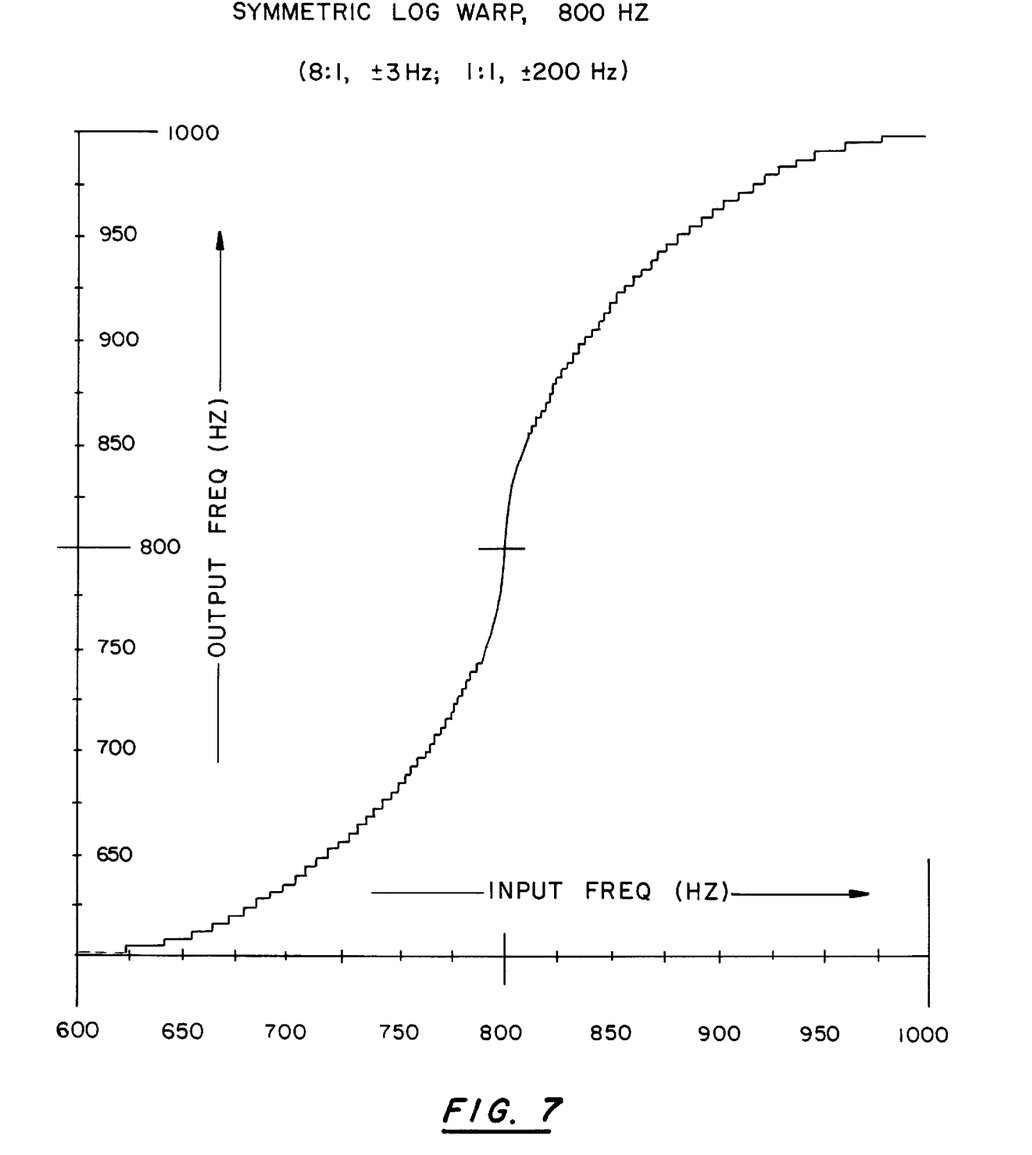
FIG. 7 shows a symmetric log WARP remap characteristic with the output frequency centered at 800 Hz.

FIG. 7 presents the plot of a symmetric Logarithmic WARP with the output frequency set at 800 Hz. Eight to one stretching is accomplished in the region near the 800 Hz input frequency. This stretching factor logarithmically approaches a one-to-one ratio within plus or minus 200 Hz about the center frequency. The choice of the algorithm to be used will depend upon the particular circumstances of operation of the sonar system. Implementation of these frequency stretching algorithms occurs in the frequency domain. The technique presented in FIG. 7 is particularly suited for simultaneous aural and visual enhancement, since the latter cannot deal with frequencies outside the ±200 Hz range.

Basically, the method involves taking the time domain signal from the existing sonar system, digitizing it, filtering it, converting it to the frequency domain, applying a frequency stretching algorithm, processing to remove undesired reverberation noises, applying signal dependent gain, reconversion to the time domain, and outputting for reception by earphones of the operator. All of this must take place such that the output signal essentially occurs in real time coincident with the physical process being monitored.

Figure 9:
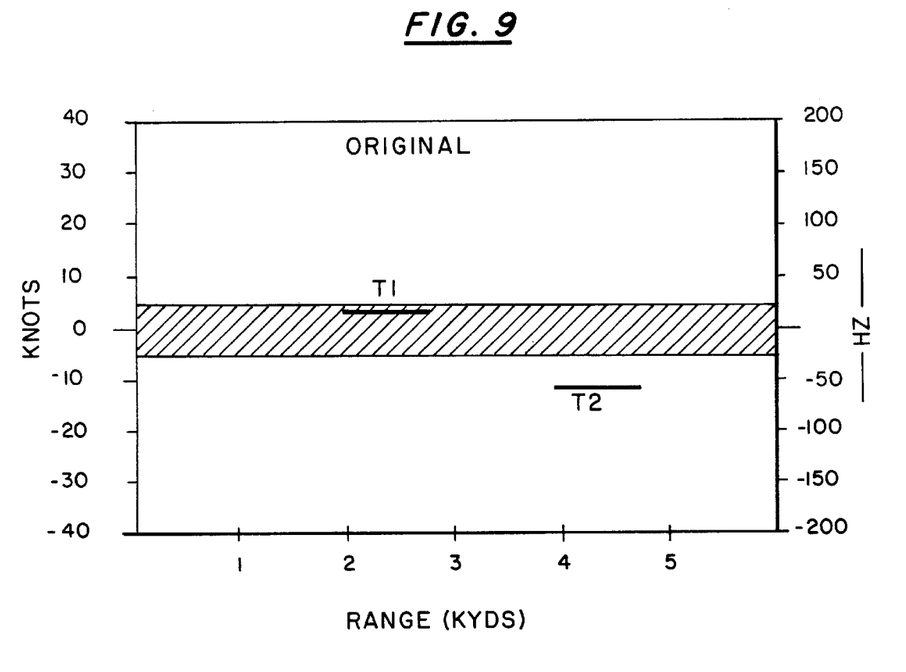
FIG. 9 shows a visual display of the original audio signal before enhancement.
Figure 10:
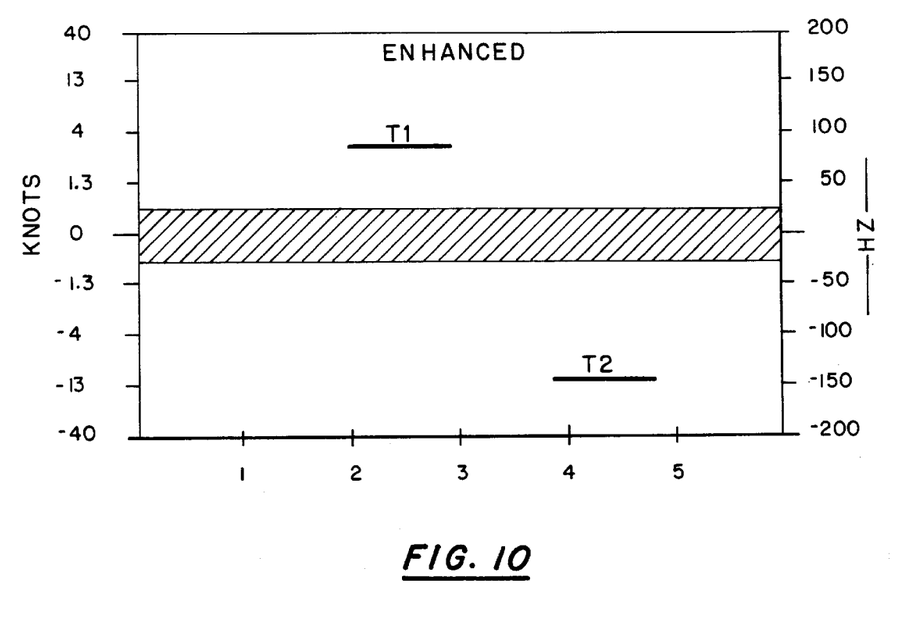
FIG. 10 shows a visual display of the audio enhanced signal.

FIGS. 9 and 10 show visual representations of signal echoes as output in the original and the enhanced forms. In FIG. 9 a frequency range of plus or minus 200 Hz about the center frequency, 800 Hz for the given Navy sonar system, is plotted along the ordinate axis. The abscissa axis represents range. Also plotted on the ordinate axis is a scale of Doppler velocities in knots. Signal echo T1 is observed as occurring within the cross hatched area which represents that frequency range lying between plus and minus 20 Hz that is usually undetectable to the human ear. Echo return T2 occurs at approximately 55 Hz referring to a target with a negative Doppler velocity of about thirteen knots. Noise effects have not been taken into consideration in these figures. Only the effect of frequency detectability to the human ear has been illustrated, wherein the cross hatched area identifies that region which is generally undetectable.

In contrast with FIG. 9, FIG. 10 shows the same Doppler targets after enhancement has been applied. The algorithm applied for FIG. 10 has been the algorithm presented in FIG. 7 of the symmetric log WARP method. Maximum stretching occurs near the zero knot axis and falls off to less stretching as one gets out to plus or minus forty knots (plus or minus 200 Hz). In FIG. 10 echo T1 now occurs in a frequency range that is easily detected aurally. Echo T2 which was originally detectable in FIG. 9 has been stretched somewhat but less than target T1 and is still within the nominally considered detectable region of interest (plus or minus 200 Hz).

Clearly, it can be recognized that this process to stretch or magnify echo frequencies away from the zero knot axis to frequency levels more easily detected by the human ear, to adaptively notch the reverb, and to apply signal-dependent gain, can also be utilized to output a signal which can be presented in a visual display in lieu of or in combination with the acoustical output that will more effectively help identify low speed targets. The output of this method, therefore, may be utilized either to feed the earphones for an operator or to feed a system for visually displaying the stretched frequency results in a visual display similar to FIG. 10.

Figure 1:
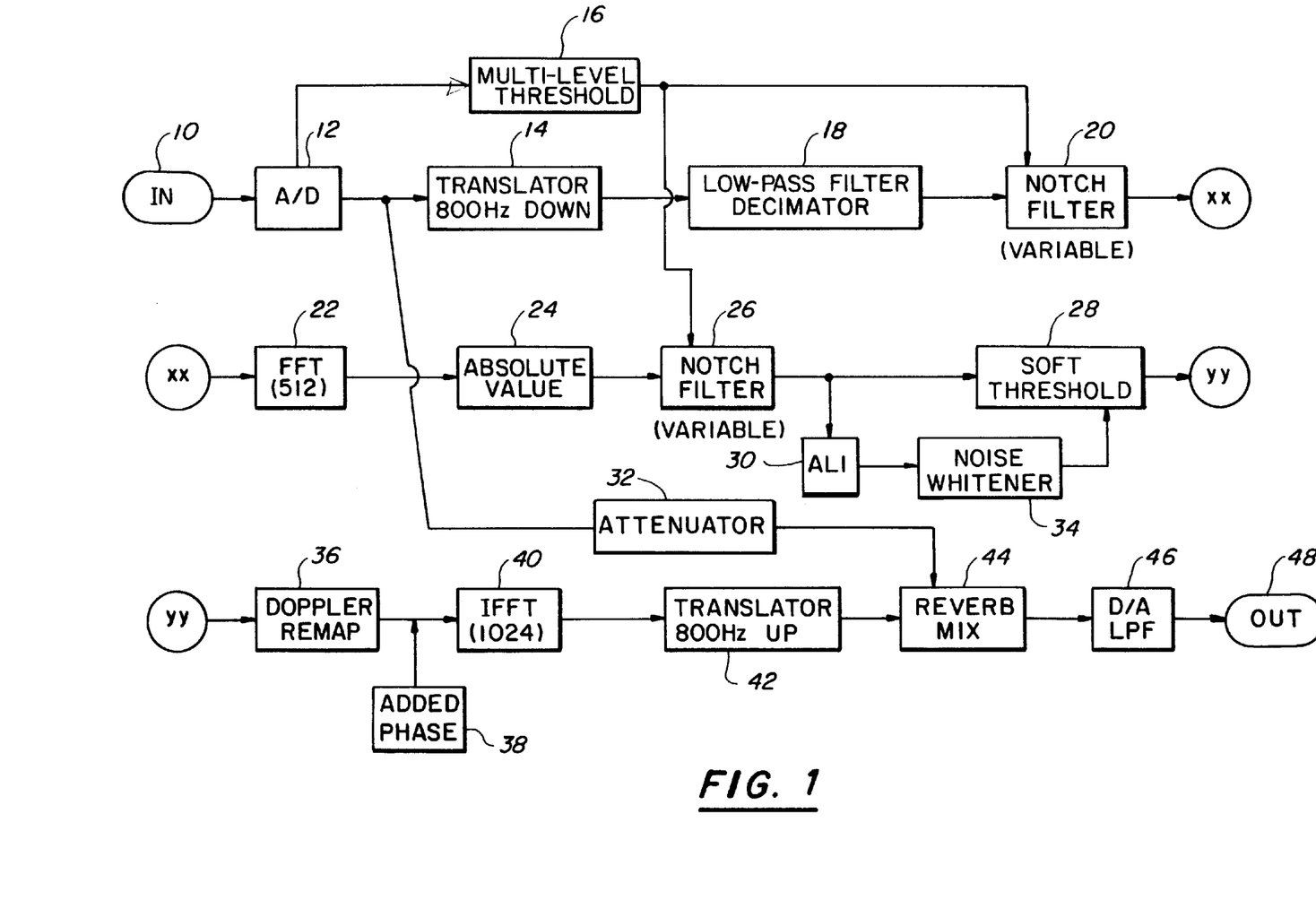
FIG. 1 is a block diagram of the enhancement system.

FIG. 1 is a block diagram showing the essential components of the enhancement system. The time domain signal from an existing sonar system is input 10 into an analog-to-digital converter 12. The signal is digitized therein and passed to a translator 14 where the center frequency is complex-translated to baseband at 0 Hz. For the particular embodiment shown the center frequency of the input signal is at 800 Hz.

After translation to 0 Hz baseband the digitized time domain signal is low-pass filtered and decimated to a new sample rate of 512 Hz, 18. The signal is then subject to a variable notch filter 20 which is adaptively controlled through a multi-level threshold controller 16. The multi-level threshold controller 16 monitors the amplitude of the signal output from A to D converter 12. Based upon this amplitude, multi-level threshold controller 16 is preprogrammed to adjust variable notch filter 20 to a preselected attenuation level. Notch filter 20, for example, will then apply a 45 DB attenuation at 0 Hz, plus or minus a preset frequency bandwidth. The purpose is to reduce the intensity of the reverberation within the selected filtered bandwidth. The time domain, digitized signal is then subjected to a discrete fast Fourier transform 22 which converts the signal to the frequency domain with 512 point blocks overlapped 75 percent.

The frequency coefficients are converted to magnitudes by taking their absolute values 24 and discarding the phases. This frequency domain signal is then again subjected to variable notch filtering 26. The variable notch filter 26 is also controlled by multi-level threshold control 16. As a general case, it is possible to carry out the method without the use of variable notch filter 26. However, the method is considerably improved operationally by applying notch filtering both to the time domain signal and to the frequency domain signal under the control of multi-level threshold 16.

Variable notch filter 26 also works to notch the reverberation within a controlled frequency bandwidth. The bandwidths of both notch filters can be adjustable, to be selected by the operator or automatically.

The following table presents the adjustment criteria used for the notch filters in this embodiment.

| Time after ping (sec) | Revert Type I (Deep) | | Reverb Type 2 (Shallow) | |
|---|---|---|---|---|
| | Time Domain Notch (dB) | Freq. Domain Notch (multiplier) | Time Domain Notch (dB) | Freq. Domain Notch (multiplier) |
| 0–3 | −45 | 0–to–1 | −45 | 0–to–1 |
| 3–8 | −30 | .5–to–1 | −45 | .5–to–1 |
| 8–16 | −15 | 1.0 | −30 | .5–to–1 |

The time domain notches are flat between 0 and ±4 Hz relative to the center frequency, and have transitions to non-notch condition between ±4–22 Hz).

The frequency domain notches are linear-sloped from 0 Hz to ±22 Hz.

These notch characteristics are also subject to variation, and can be narrowed or widened to fit different reverberation width conditions (as well as attenuation characteristics).

The signal output from notch filter 26 is then subjected to separate parallel paths. Along one path the signal undergoes automatic line integration 30. Each coefficient is smoothed by exponential averaging which keeps 75 percent of the previous value and adds 25 percent of the new value to it. The signal is then fed to noise whitener 34 wherein an estimate of the average noise background level is made. This average noise level is determined at each frequency by comparing that frequency to a small frequency band centered about that frequency.

The output signal after being subject to noise whitener 34 is then compared 28 against the second parallel path signal fed directly from notch filter 26. Comparison is made of the frequency domain data from the smoothed "signal-only" file output from noise whitener 34 with the frequency domain data from the unsmooth notch-filtered "signal+noise" file output from notch filter 26. The "signal-only" coefficients are raised to the third power (cubed), and then multiplied by the corresponding "signal+noise" coefficients from the previous transform (¼th second earlier). If this product exceeds a preset maximum threshold, then the result is limited or reduced, but otherwise is used as the output quantity. The effect is to provide a large signal gain when the signal is present, but very little or no gain when it is not. The "no-gain" condition prevails when the "signal-only" coefficient fails to exceed a minimum threshold.

The signal is now subject to Doppler remapping 36. Remapping accomplishes four main purposes. (1) It moves the coefficients which are near 0-Doppler to positions much farther away from 0-Doppler, preserving sign ("up" or "down" Doppler) in relative position. This allows the human ear to discriminate much more easily those frequencies which would otherwise be too close to 800 Hz to differentiate from reverberation. (2) It randomizes the sign of the frequency coefficients, keeping the sign constant over time (over successive transforms). This helps to minimize boundary clicks when the inverse transform waveforms are abutted to achieve the composite output. (3) It constructs an anti-symmetric version of the coefficients such that the subsequent inverse transforms will result in a real (not complex) sequence of values whose zero-crossings occur at the transform boundaries. (4) It offsets the coefficients away from baseband (zero frequency) as the first step in achieving the final 800 Hz reconstructed center frequency for 0-Doppler.

It is the function of Doppler remap 36 to apply the specific stretching algorithm for moving frequency coefficients away from near 0-Doppler positions. Phase is added 38 to minimize boundary clicks when the inverse Fourier transform waveforms are connected together. Added phase 38 reintroduces phases with random sign prior to the complex inverse discrete Fourier transform process.

A 1024 inverse Fourier transform 40 is performed on the data output from Doppler remapping. The signal has now been reconverted into the time domain and pieced together sequentially in a manner to reduce boundary clicks and to present a smooth time domain function for further processing.

The signal in the time domain is then subjected to translation of the center frequency from baseband up to 800 Hz 42. Each of the sixty four input records is repeated once and abutted next to its neighbors to achieve a continuous, composite output. The earlier 75 percent overlap accounts for a factor of four, the 1024-point transform length for a factor of 2, and the once-repeated records for a factor of 2, so that the resulting file has sixteen times as many sample values as the baseband files prior to the forward Fourier transform. Thus, when these are played back in the sixteen-second original time interval, a sample rate of 8192 Hz is achieved, and the 100 Hz 0-Doppler bin is heard at the center frequency of 800 Hz (the 1024-point records now amount to one-eighth second).

After translation the enhanced signal output is then mixed together with some of the original reverberation 44. Signal output from analog to digital converter 12 was subject to attenuation 32 and is made available at the reverberation mixing stage 44 for this process. This provides the user with a reference so that signals can be recognized to be either above or below the 0-Doppler characteristic frequency. It also gives a reliable indication for the start-of-ping time.

After reverberation mixing the signal is fed to a digital to analog converter 46 with a 1,600 Hz low pass filter. Following this filtering and conversion the signal is output to either earphones for the sonar operator or to further processing for visual display.

It is to be understood that the numerical parameters used and presented before in the various steps or elements of the method or system can be altered and chosen otherwise. The above values were specifically selected for tailoring to the particular sonar system for which the preferred embodiment was applied. For example, sampling rates and the ratio of decimation may be selected other than presented in the above text.

An alternative to attenuator 32 acting upon the digitized time domain signal output from A to D converter 12 would be to inject at reverberation mixer 44 a standard library of reverberation signals with particular characteristics useful for the purpose at hand. In this case the library reverberation signal would be fed directly into reverberation mixer 44 to interact with the output of the signal from translator 42.

Obviously, many modifications and variations of the present invention are possible in the light of the above teachings. It is therefore to be understood that within the scope of the appended claims the invention may be practiced otherwise than as specifically described.

What is claimed is:

1. A method of enhancing echoes for an active sonar system, said method comprising the steps of:

sampling at a first predetermined sampling rate and digitizing an input time domain analog signal at an original center frequency to thereby generate a time domain digitized signal;

complex translating the digitized time domain signal to a new center frequency at baseband to thereby generate a basebanded time domain signal;

reducing the sampling rate of the basebanded time domain signal to a second predetermined sample rate;

notch filtering the time domain digitized signal to result in a notch filtered time domain signal and to attenuate a narrow frequency band centered on the new center frequency;

transforming the notch filtered time domain signal to the frequency domain via a discrete Fourier transform so as to generate a frequency domain signal comprising a set of frequency coefficients and a set of phases;

extracting the magnitudes only of the frequency coefficients, with the phases being discarded to result in a frequency domain magnitude signal;

performing a line integration on a select number of adjacent digital transforms of the frequency domain signal so as to generate a line integrated signal;

estimating a background noise level at each frequency using the line integrated signal;

comparing the magnitudes of the frequency coefficients with the estimated background noise level at each frequency in a manner where the frequency coefficient magnitudes at those frequencies where such coefficient magnitudes exceed a preset threshold are subjected to a non-linear gain and passed along, while those frequency coefficient magnitudes which fail to cross the threshold level are passed along with no gain;

reallocating the frequency coefficients for frequency spreading according to a preselected algorithm;

taking an inverse discrete Fourier transform of the frequency spreading frequency domain signal;

duplicating the inverse Fourier transformed signal blocks and connecting them end to end in a smooth manner, whereby a digitized time domain signal results at a preselected sampling rate, and the resultant signal has been translated back to the original center frequency;

mixing a predetermined reverberation signal with the heretofore processed signal to generate a final enhanced time domain signal; and converting the final enhanced time domain signal from digital form to analog form for outputting.

2. A method according to claim 1 which includes the further step of:

notching the frequency domain magnitude signal, said notching to further attenuate the signal in a preselected bandwidth about the new center frequency.

3. A method according to claim 2 which includes the further step of:

adaptively controlling the attenuation levels for the time domain notching and the frequency domain notching, said adaptive controlling occurring through a predetermined algorithm which reacts to the magnitude of the digitized time domain signal and sets in a predetermined manner the attenuation levels for each notching function.

4. A method according to claim 3 which includes the further step of:

outputting the final enhanced time domain signal into an audio monitoring system.

5. A method according to claim 3 which includes the further step of:

outputting the final enhanced time domain signal to a processor for visual display purposes.

* * * * *